United States Patent
Rublee et al.

(10) Patent No.: US 12,168,490 B2
(45) Date of Patent: Dec. 17, 2024

(54) MODULAR VEHICLE SYSTEM AND WHEEL ASSEMBLY

(71) Applicant: Farm-ng Inc., Watsonville, CA (US)

(72) Inventors: Ethan Rublee, Watsonville, CA (US); Matthew Bitterman, Southport, ME (US)

(73) Assignee: Farm-ng Inc., Watsonville, CA (US)

( * ) Notice: Subject to any disclaimer, the term of this patent is extended or adjusted under 35 U.S.C. 154(b) by 0 days.

(21) Appl. No.: 18/588,858

(22) Filed: Feb. 27, 2024

(65) Prior Publication Data

US 2024/0199152 A1 Jun. 20, 2024

Related U.S. Application Data

(63) Continuation of application No. PCT/US2021/047918, filed on Aug. 27, 2021.

(51) Int. Cl.
| | |
|---|---|
| *B62D 63/02* | (2006.01) |
| *B60B 35/00* | (2006.01) |
| *B60K 7/00* | (2006.01) |
| *B60L 15/20* | (2006.01) |
| *B60L 50/60* | (2019.01) |

(52) U.S. Cl.
CPC .......... *B62D 63/025* (2013.01); *B60B 35/005* (2013.01); *B60K 7/0007* (2013.01); *B60L 15/20* (2013.01); *B60L 50/60* (2019.02)

(58) Field of Classification Search
CPC .. B62D 63/025; B60B 35/005; B60K 7/0007; B60L 15/20; B60L 50/60
See application file for complete search history.

(56) References Cited

U.S. PATENT DOCUMENTS

| | | | |
|---|---|---|---|
| 7,469,902 B1 * | 12/2008 | Hale | F41J 9/02 273/359 |
| 8,544,570 B2 * | 10/2013 | Ishii | B62D 11/24 701/41 |
| 10,245,936 B2 * | 4/2019 | Gillett | B60L 53/80 |
| 10,576,360 B2 * | 3/2020 | Quick | B60K 7/00 |
| 10,766,302 B1 * | 9/2020 | McInturff | A63C 17/012 |
| 10,906,470 B2 * | 2/2021 | Hernandez | B60R 7/02 |
| 11,161,031 B2 * | 11/2021 | Anning | A63C 17/12 |
| 11,266,900 B2 * | 3/2022 | Rautiainen | B32B 3/18 |
| 11,702,281 B2 * | 7/2023 | Collins | B62B 3/022 280/43.23 |
| 2002/0130771 A1 * | 9/2002 | Osborne | B60C 23/008 340/441 |
| 2004/0232632 A1 * | 11/2004 | Beck | B60G 17/016 701/37 |
| 2008/0017426 A1 | 1/2008 | Walters et al. | |

(Continued)

*Primary Examiner* — Tyler J Lee
(74) *Attorney, Agent, or Firm* — The Webb Law Firm

(57) ABSTRACT

Provided is a wheel assembly including a housing having a top side, an attachment arrangement on the top side of the housing and configured to be removably attached to an external support, a wheel supported by the housing and arranged below the top side of the housing, a motor supported by the housing and configured to move the wheel, a network interface supported by the housing, and a controller in communication with the motor and the network interface, the controller configured to control the motor based on at least one command received via the network interface. A modular vehicle system is also described.

26 Claims, 12 Drawing Sheets

(56) References Cited

U.S. PATENT DOCUMENTS

| | | | |
|---|---|---|---|
| 2010/0222941 A1* | 9/2010 | Chang | A63C 17/12 |
| | | | 180/181 |
| 2012/0026293 A1* | 2/2012 | Gruetzmann | G01B 11/275 |
| | | | 348/46 |
| 2013/0328381 A1* | 12/2013 | Holloway | B60B 7/20 |
| | | | 301/37.25 |
| 2014/0318879 A1 | 10/2014 | Gillett | |
| 2014/0326525 A1 | 11/2014 | Doerksen | |
| 2014/0332296 A1* | 11/2014 | Stewart | B62B 5/005 |
| | | | 180/170 |
| 2016/0014252 A1 | 1/2016 | Biderman et al. | |
| 2017/0240169 A1 | 8/2017 | Coulter et al. | |
| 2017/0344009 A1 | 11/2017 | Wernersbach | |
| 2021/0362543 A1* | 11/2021 | Howard | B60T 8/1761 |
| 2022/0371819 A1* | 11/2022 | Collins | B65F 1/1473 |

* cited by examiner

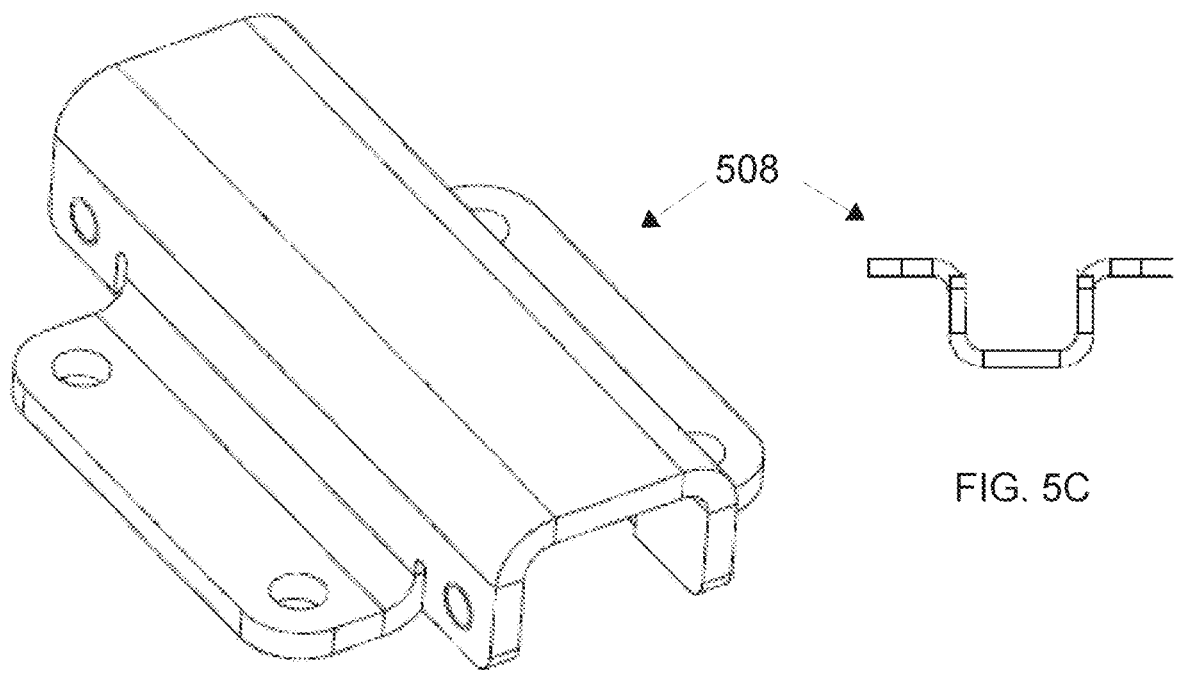
FIG. 5B
FIG. 5C
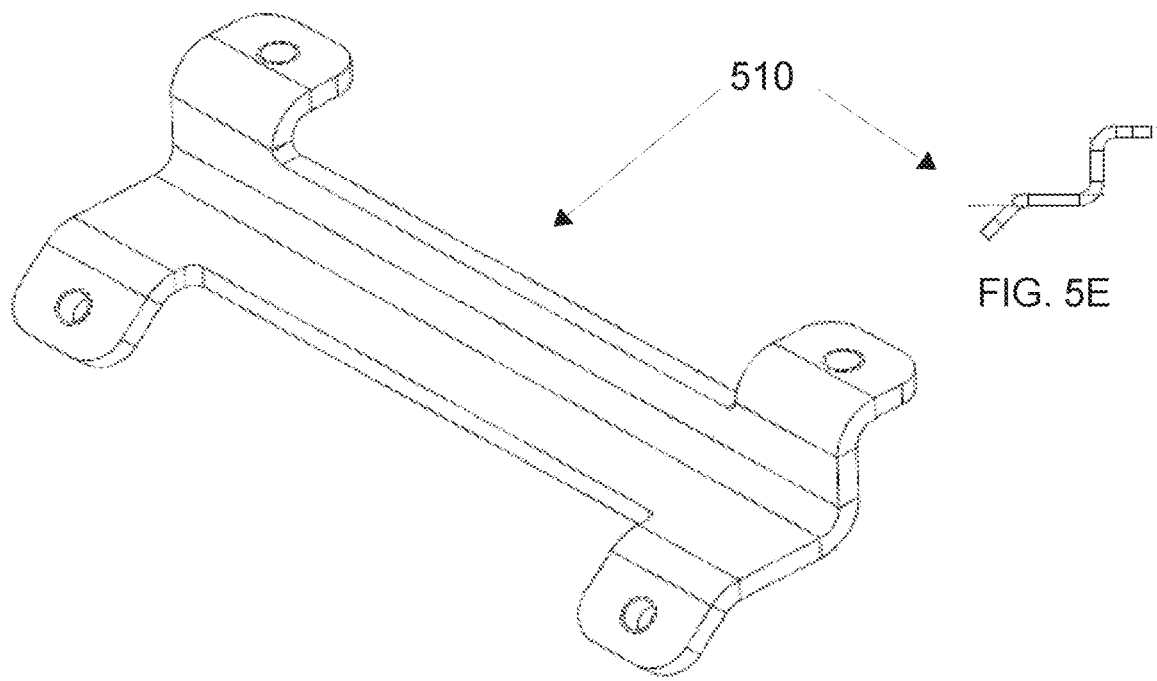
FIG. 5D
FIG. 5E

MODULAR VEHICLE SYSTEM AND WHEEL ASSEMBLY

CROSS-REFERENCE TO RELATED APPLICATION

This application is a continuation of International Application No. PCT/US21/47918 filed Aug. 27, 2021 the disclosure of which is hereby incorporated by reference in its entirety.

BACKGROUND

1. Field

This disclosure relates generally to vehicle systems, wheel assemblies, control systems, and related processes.

2. Technical Considerations

Field robots are a type of professional service robot that automates manual tasks. Such robots are often used on land and operate fully autonomously in dynamic, unstructured environments. These robots are adaptive, responsive robots that work under variable conditions, sometimes even in unexplored territory. There are many different types of field robots used in agriculture. Field robots are used on small farms or vineyards and enable precision agriculture techniques. Often, field robots are used to autonomously monitor soil respiration, photosynthetic activity, leaf area indexes (LAI), and other biological factors. Field robots for weed control can autonomously navigate a farm and deliver targeted sprays of herbicides to eliminate weeds. This approach reduces crops' exposure to herbicides and helps prevent the growth of herbicide-resistant weeds. Moreover, field robots may be used for nursery automation in crop nurseries, for example, to move plants around large greenhouses. These robots create major efficiencies for crop nurseries and help address a growing labor shortage. For harvesting crops, specialized field robots can work constantly or near-constantly for faster harvesting, in some cases completing the same amount of work as approximately 30 workers. Field robots are starting to be used to harvest fruit in addition to crops, but fruit harvesting is notoriously difficult for robots. Fruit-harvesting field robots are equipped with advanced vision systems to identify fruits and grasp them without damaging them. Further, field robots with 3D vision systems can plant and seed crops for optimal growth, often for lettuce farming and vineyards.

Field robots and manually-controlled small vehicles are not easily adjustable with regard to track width, vertical height clearance, power, or weight. As an example, existing harvesting platforms are large, heavy, and/or specifically engineered for one type of crop. Small farms require smaller, less expensive, digitally-enabled general purpose tools the industry has failed to produce. Smaller farms cultivating a greater diversity of crops rarely have standardized bed widths. Often there are several bed widths within a single farm. Canonical tractors are bought with one set "track width" specification or require expensive wheel extensions or other hardware to be adapted to adjust this dimension. Such adaptations are mechanically intensive projects and often take heavy tools and significant time to change. Typically, tractors have vertical clearance heights directly related to the wheel radius and general chassis type of the tractor. Driving in fields with taller crops often requires specialty "high-clearance" type tractors. These large tractors, generally powered by diesel engines, compact soil and are cost-prohibitive for small farms. In addition, each field robot or tractor is generally configured to operate in a specific range of field conditions and terrains (e.g., high slope vineyard terrain, flat raised beds). Multiple tractors may be necessary for various field conditions and/or operations. Moreover, given the high value of real-estate in greenhouses or hoop-houses, it can be extremely difficult or impossible to turn around full-size tractors based on an Ackermann steering mechanism as they require large radii and extended space on both sides of any bed. It is therefore desirable to provide a flexible modular vehicle that can be modified and adapted for multiple uses as a field robot, thereby reducing the total cost of ownership of agricultural field robots. It is also desirable to increase the functionalities that can be performed by different arrangements of a modular vehicle. Moreover, it is desirable to have implements that are affixed to the field robot itself rather than trailered, and also to have a vehicle that can turn in place and prevent excess allocation of real estate to vehicle circulation.

SUMMARY

According to non-limiting embodiments or aspects, provided is a wheel assembly comprising: a housing having a top side; an attachment arrangement on the top side of the housing and configured to be removably attached to an external support; a wheel supported by the housing and arranged below the top side of the housing; a motor supported by the housing and configured to move the wheel; a network interface supported by the housing; and a controller in communication with the motor and the network interface, the controller configured to control the motor based on at least one command received via the network interface.

In non-limiting embodiments or aspects, the motor is configured to move the wheel by at least one of rotationally driving the wheel and turning the wheel at an angle. In non-limiting embodiments or aspects, the wheel assembly further comprises a battery dock supported by the housing and in communication with the motor, the battery dock configured to receive a removable battery. In non-limiting embodiments or aspects, the attachment arrangement comprises a clamp. In non-limiting embodiments or aspects, the attachment arrangement is configured to receive the external support and to slide along the external support. In non-limiting embodiments or aspects, the housing is fork-shaped such that two portions of the housing extend downward from the top side of the housing to a center axis of the wheel. In non-limiting embodiments or aspects, the controller is configured to receive the at least one command from at least one other wheel assembly. In non-limiting embodiments or aspects, the attachment arrangement is fixed to or integral with the top side of the housing. In non-limiting embodiments or aspects, the wheel assembly further comprises a computer-readable medium having stored thereon a unique identifier uniquely identifying the wheel assembly from a plurality of wheel assemblies. In non-limiting embodiments or aspects, the controller is configured to control the motor based on the unique identifier received via the network interface. In non-limiting embodiments or aspects, the housing comprises a sheet of material folded over a portion of the wheel.

According to non-limiting embodiments or aspects, provided is a modular vehicle system comprising: a lateral support; a first wheel assembly removably attached to the lateral support, the first wheel assembly comprising a first controller; a second wheel assembly removably attached to the lateral support, the second wheel assembly comprising a second controller; a processor configured to communicate commands to the first controller and the second controller to control the first wheel assembly and the second wheel assembly; and a device network establishing communication between the processor, the first controller, and the second controller.

In non-limiting embodiments or aspects, the first wheel assembly and the second wheel assembly are configured to slide along a length of the lateral support and to be removably attached to the lateral support at a chosen position. In non-limiting embodiments or aspects, the device network comprises at least one of the following: a mesh network, a daisy-chained network, a hub-and-spoke network, or any combination thereof. In non-limiting embodiments or aspects, the modular vehicle system further comprises a vehicle chassis including the lateral support. In non-limiting embodiments or aspects, the modular vehicle system further comprises a camera in communication with the device network. In non-limiting embodiments or aspects, the modular vehicle system further comprises a battery dock configured to receive a removable battery. In non-limiting embodiments or aspects, the modular vehicle system further comprises an attachment arrangement configured to removably attach at least one of the first wheel assembly and the second wheel assembly to the lateral support. In non-limiting embodiments or aspects, the attachment arrangement is configured to slide along the lateral support while unsecured.

According to non-limiting embodiments or aspects, provided is a modular vehicle system comprising at least one processor programmed or configured to: determine a configuration of at least one wheel assembly of the modular vehicle; generate a kinematic control model based on the configuration of the at least one wheel assembly and dimensions of the modular vehicle; and control the modular vehicle based on the kinematic control model.

In non-limiting embodiments or aspects, the modular vehicle system further comprises a data bus interface configured to communicate with other devices on a common data bus. In non-limiting embodiments or aspects, the modular vehicle system further comprises a power bus interface configured to receive power from a power bus independent of the common data bus and the data bus interface. In non-limiting embodiments or aspects, the device network comprises a data bus connected to each of the processor, the first controller, and the second controller. In non-limiting embodiments or aspects, the modular vehicle system further comprises a power bus independent of the data bus and having a higher voltage than the data bus, the power bus configured to provide power to a motor of the first wheel assembly, a motor of the second wheel assembly, and the data bus. In non-limiting embodiments or aspects, the modular vehicle system further comprises a connector including a power injector configured to provide power from the power bus to the data bus. In non-limiting embodiments or aspects, the modular vehicle system further comprises at least one agricultural tool connected to the data bus. In non-limiting embodiments or aspects, the modular vehicle system further comprises a bumper. In non-limiting embodiments or aspects, the bumper comprises at least one sensor in communication with the processor via the device network. In non-limiting embodiments or aspects, the processor comprises a central controller configured to issue commands to the first controller and the second controller based on a kinematic control model. In non-limiting embodiments or aspects, the central controller is arranged on a vehicle chassis external from the first wheel assembly and the second wheel assembly. In non-limiting embodiments or aspects, the at least one processor is further programmed or configured to train the kinematic control model based on data received during operation of the modular vehicle. In non-limiting embodiments or aspects, wherein controlling the modular vehicle based on the kinematic control model comprises inputting, into the kinematic control model, the configuration of the at least one wheel assembly, the dimensions of the modular vehicle, and a target location or direction.

Other non-limiting embodiments or aspects will be set forth in the following numbered clauses:

Clause 1: A wheel assembly comprising: a housing having a top side; an attachment arrangement on the top side of the housing and configured to be removably attached to an external support; a wheel supported by the housing and arranged below the top side of the housing; a motor supported by the housing and configured to move the wheel; a network interface supported by the housing; and a controller in communication with the motor and the network interface, the controller configured to control the motor based on at least one command received via the network interface.

Clause 2: The wheel assembly of clause 1, wherein the motor is configured to move the wheel by at least one of rotationally driving the wheel and turning the wheel at an angle.

Clause 3: The wheel assembly of clauses 1 or 2, further comprising a battery dock supported by the housing and in communication with the motor, the battery dock configured to receive a removable battery.

Clause 4: The wheel assembly of any of clauses 1-3, wherein the attachment arrangement comprises a clamp.

Clause 5: The wheel assembly of any of clauses 1-4, wherein the attachment arrangement is configured to receive the external support and to slide along the external support.

Clause 6: The wheel assembly of any of clauses 1-5, wherein the housing is fork-shaped such that two portions of the housing extend downward from the top side of the housing to a center axis of the wheel.

Clause 7: The wheel assembly of any of clauses 1-6, wherein the controller is configured to receive the at least one command from at least one other wheel assembly.

Clause 8: The wheel assembly of any of clauses 1-7, wherein the attachment arrangement is fixed to or integral with the top side of the housing.

Clause 9: The wheel assembly of any of clauses 1-8, further comprising a computer-readable medium having stored thereon a unique identifier uniquely identifying the wheel assembly from a plurality of wheel assemblies.

Clause 10: The wheel assembly of any of clauses 1-9, wherein the controller is configured to control the motor based on the unique identifier received via the network interface.

Clause 11: The wheel assembly of any of clauses 1-10, wherein the housing comprises a sheet of material folded over a portion of the wheel.

Clause 12: A modular vehicle system comprising: a lateral support; a first wheel assembly removably attached to the lateral support, the first wheel assembly comprising a first controller; a second wheel assembly removably attached to the lateral support, the second wheel assembly comprising a second controller; a processor configured to communicate commands to the first controller and the second controller to control the first wheel assembly and the second wheel assembly; and a device network establishing communication between the processor, the first controller, and the second controller.

Clause 13: The modular vehicle system of clause 12, wherein the first wheel assembly and the second wheel assembly are configured to slide along a length of the lateral support and to be removably attached to the lateral support at a chosen position.

Clause 14: The modular vehicle system of clauses 12 or 13, wherein the device network comprises at least one of the following: a mesh network, a daisy-chained network, a hub-and-spoke network, or any combination thereof.

Clause 15: The modular vehicle system of any of clauses 12-14, further comprising a vehicle chassis including the lateral support.

Clause 16: The modular system of any of clauses 12-15, further comprising a camera in communication with the device network.

Clause 17: The modular system of any of clauses 12-16, further comprising a battery dock configured to receive a removable battery.

Clause 18: The modular system of any of clauses 12-17, further comprising an attachment arrangement configured to removably attach at least one of the first wheel assembly and the second wheel assembly to the lateral support.

Clause 19: The modular system of any of clauses 12-18, wherein the attachment arrangement is configured to slide along the lateral support while unsecured.

Clause 20: A modular vehicle system comprising at least one processor programmed or configured to: determine a configuration of at least one wheel assembly of the modular vehicle; generate a kinematic control model based on the configuration of the at least one wheel assembly and dimensions of the modular vehicle; and control the modular vehicle based on the kinematic control model.

Clause 21: The wheel assembly of any of clauses 1-11, further comprising a data bus interface configured to communicate with other devices on a common data bus.

Clause 22: The wheel assembly of any of clauses 1-11 and 21, further comprising a power bus interface configured to receive power from a power bus independent of the common data bus and the data bus interface.

Clause 23: The modular vehicle system of any of clause 21, wherein the device network comprises a data bus connected to each of the processor, the first controller, and the second controller.

Clause 24: The modular vehicle system of clauses 21 or 23, further comprising a power bus independent of the data bus and having a higher voltage than the data bus, the power bus configured to provide power to a motor of the first wheel assembly, a motor of the second wheel assembly, and the data bus.

Clause 25: The modular vehicle system of any of clauses 21, 23, or 24, further comprising a connector including a power injector configured to provide power from the power bus to the data bus.

Clause 26: The modular vehicle system of any of clauses 21 or 23-25, further comprising at least one agricultural tool connected to the data bus.

Clause 27: The wheel assembly of any of clauses 1-11, 21, or 22, further comprising a bumper.

Clause 28: The modular vehicle system of any of clauses 21 or 23-26, further comprising a bumper.

Clause 29: The modular vehicle system of any of clauses 21, 23-26, or 28, wherein the bumper comprises at least one sensor in communication with the processor via the device network.

Clause 30: The modular vehicle system of any of clauses 21, 23-26, 28, or 29, wherein the processor comprises a central controller configured to issue commands to the first controller and the second controller based on a kinematic control model.

Clause 31: The modular vehicle system of any of clauses 21, 23-26, or 28-30, wherein the central controller is arranged on a vehicle chassis external from the first wheel assembly and the second wheel assembly.

Clause 32: The modular vehicle system of any of clauses 21, 23-26, or 28-31, wherein the at least one processor is further programmed or configured to train the kinematic control model based on data received during operation of the modular vehicle.

Clause 33: The modular vehicle system of any of clauses 21, 23-26, or 28-33, wherein controlling the modular vehicle based on the kinematic control model comprises inputting, into the kinematic control model, the configuration of the at least one wheel assembly, the dimensions of the modular vehicle, and a target location or direction.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Additional advantages and details of the invention are explained in greater detail below with reference to the exemplary embodiments that are illustrated in the accompanying schematic figures, in which:

FIG. 5B is a perspective view of an attachment arrangement according to non-limiting embodiments;

FIG. 5C is a cross-sectional view of the attachment arrangement shown in FIG. 5B;

FIG. 5D is a perspective view of an attachment arrangement according to non-limiting embodiments;

FIG. 5E is a cross-sectional view of the attachment arrangement shown in FIG. 5D;

DESCRIPTION

Figure 1A:
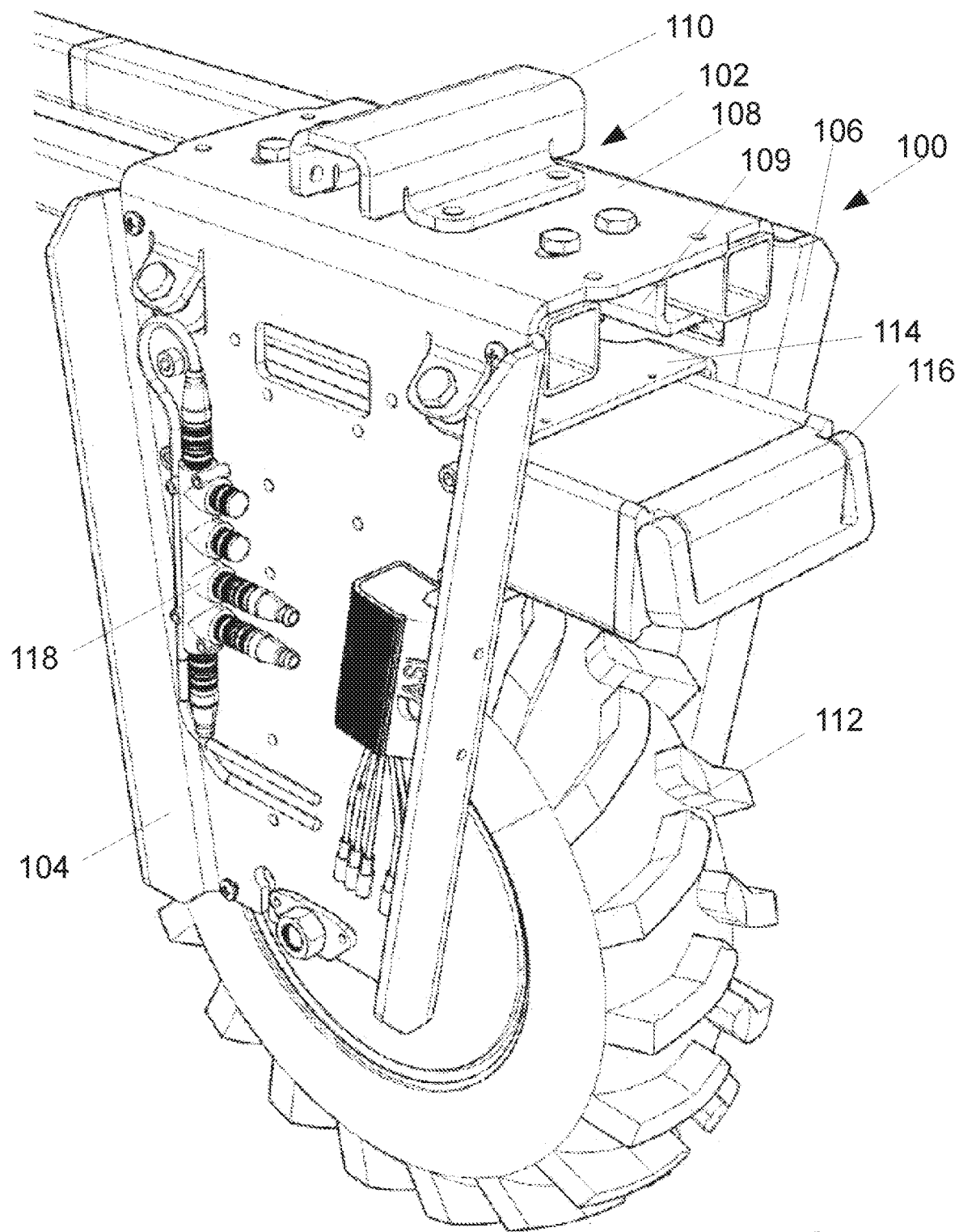
FIG. 1A is a diagram of a wheel assembly according to non-limiting embodiments.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "controller" may refer to one or more electronic devices configured to process data. A controller may include, for example, any type of data processor (e.g., a microprocessor, Central Processing Unit (CPU), Graphics Processing Unit (GPU), and/or the like). A controller may be a microcontroller in the form of one or more integrated circuits (IC). A controller may be dedicated for a particular purpose (e.g., controlling a motor) or may be multi-purpose and perform several different functions. A "computing device," as used herein, may refer to data processing device that includes a controller and one or more additional components, such as memory, a display, an input device, a network interface, and/or the like. A computing device may include, for example, one or more mobile devices (e.g., smartphones, wearable devices, and/or the like), personal computers, server computers, and/or the like.

Multiple controllers and/or computing devices (e.g., servers, mobile devices, etc.) directly or indirectly communicating in a networked arrangement may constitute a "system." Reference to "a controller" or "a processor," as used herein, may refer to a previously-recited controller that is recited as performing a previous step or function, a different controller, and/or a combination of controllers. For example, as used in the specification and the claims, a first "controller" or "processor" that is recited as performing a first step or function may refer to the same or different "controller" or "processor" recited as performing a second step or function.

Figure 1B:
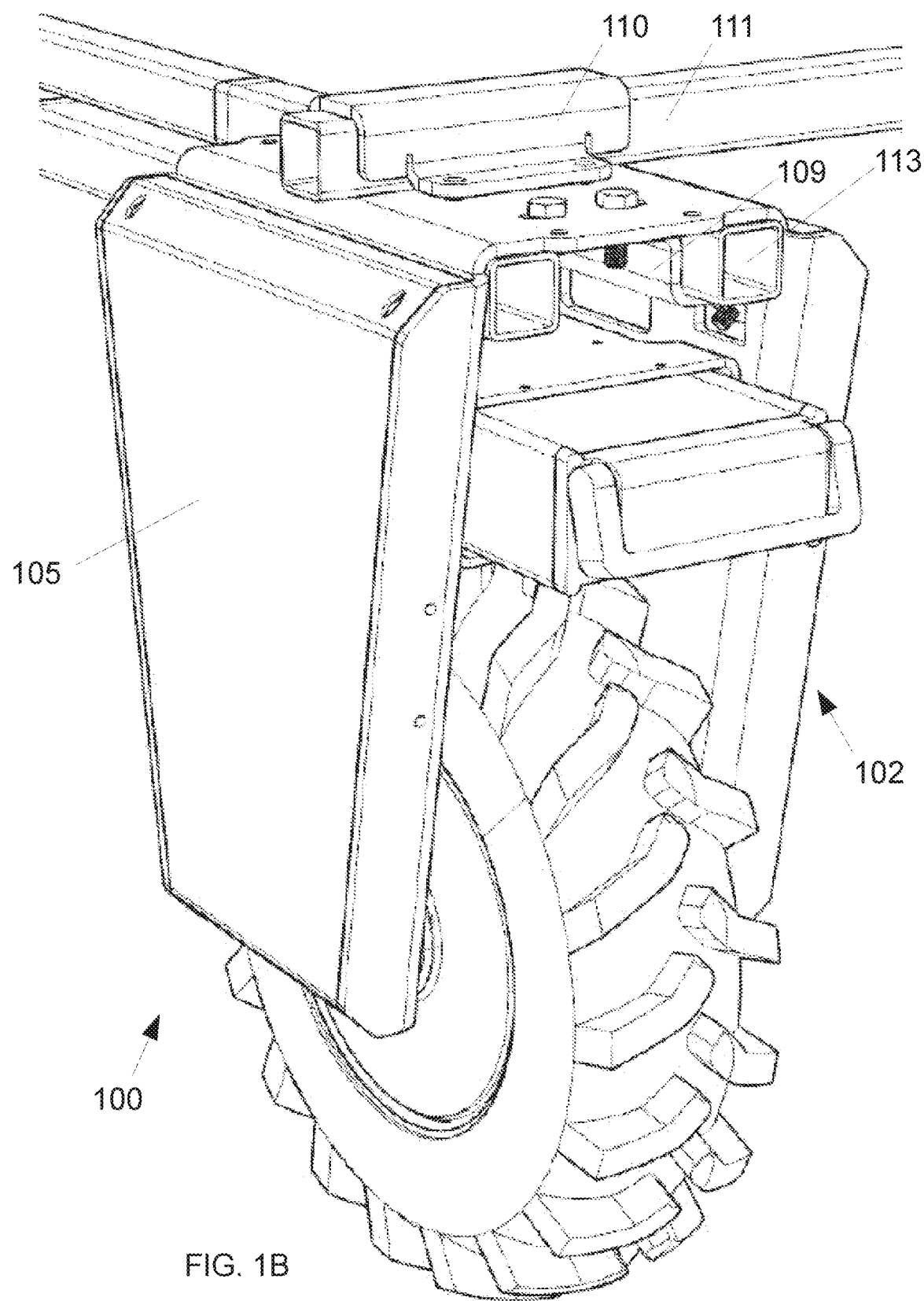
FIG. 1B is a diagram of a wheel assembly according to non-limiting embodiments.

Referring now to FIGS. 1A and 1B, a wheel assembly 100 is shown according to non-limiting embodiments. FIG. 1A shows a wheel assembly 100 without a cover housing element 105 shown in FIG. 1B. The wheel assembly 100 includes a wheel 112 supported by a housing 102. The housing may include electronic components such as, for example, one or more motors (not shown in FIG. 1A or 1B), one or more controllers (not shown in FIG. 1A or 1B), one or more connection interfaces 118 (e.g., a connection hub) for connecting one or more other devices (e.g., other wheel assemblies, tools, or other devices), one or more wireless network interfaces (not shown in FIG. 1A or 1B), and/or the like. The housing 102 may also include a battery compartment 114 (e.g., battery dock) that receives a removable battery 116, allowing the wheel assembly to be independently powered. In other examples, the battery 116 may also be integrated or attached to the housing 102 and may be charged by a cable.

With continued reference to FIGS. 1A and 1B, one or more attachment arrangements 109, 110 may be supported by the housing 102. The attachment arrangements 109, 110 may include any device for connecting the wheel assembly 100 to an external support or device. For example, the attachment arrangements 109, 110 may include a clamp (e.g., a tube clamp or other type of clamp) that may be secured to a support, such as a tube (square steel tube, speed rail tubing, etc.), bar, rail, platform, and/or the like. The support may, in some examples, be attached to or part of the chassis of a vehicle (e.g., such as a field robot). The attachment arrangements 109, 110 may also be or include a bolt, a clasp, a magnet, a connector, and/or the like. The attachment arrangements 109, 110 shown in FIGS. 1A and 1B include an elongated aperture through which an external support 111, 113, such as a bar, rail, tube, and/or the like, may pass and be secured. Attachment arrangement 110 is secured on a top-facing exterior surface of the top of the housing 102 and receives support 111, while attachment arrangement 109 is secured beneath the top of the housing 102 and receives support 113 perpendicularly to support 111. However, it will be appreciated that one or more attachment arrangements 109, 110 may be located on top of and/or underneath the top of the housing 102.

In some examples, the attachment arrangement 109, 110 may be adapted to slide along such an external support until being secured. The external supports may be horizontal, vertical, or angled. The attachment arrangement 110 may include a wheel or roller in some examples to facilitate sliding along the external support. In other examples, the attachment arrangement 110 may be fitted around a particular portion of a support. Accordingly, by adjusting how and where a wheel assembly is attached to a vehicle, the width, length, and/or height of the vehicle profile may be modified to accommodate a different track width and/or clearance height. Such customized vehicle profiles may be based on different uses (e.g., different crops, different crop bed configurations, different plant growth stages, and/or the like).

In non-limiting embodiments, the wheel assembly 100 may be attached to existing field robots and/or vehicular tools, such as bug vacuums, flame weeders (e.g., a propane torch or the like), conventional weeding mechanisms, wheel hoes, seeders, hitches, sprayers, actuators (e.g., to touch or probe soil, plants, markers, pests, etc.), and/or the like. Moreover, gas-driven drivetrains on existing field robots and/or vehicular tools may be replaced with one or more wheel assemblies on an existing chassis (e.g., frame) to reduce emissions, use less or cheaper energy, reduce noise, and provide instantaneous torque. Additional wheel assemblies may be added to increase horsepower, change traction performance, change steering and/or friction characteristics, or the like. Multiple wheel assemblies may be used for 4-wheel drive, 6-wheel drive, 8-wheel drive, and/or the like. Different control paradigms (e.g., control models) may be used based on the arrangement, such as a differential control paradigm for 2-wheel drive applications and a skid-steering control paradigm for 4-wheel drive or the like. Moreover, wheel assemblies may be provided with tracks (e.g., continuous tracks) encompassing two or more wheels. Tracks may be tensioned by moving the wheel assemblies closer or farther apart. In some examples, the controls for the wheel assemblies that are part of a continuous track may be mirrored such that they move identically. Various other arrangements are possible.

The wheel assembly 100 may also include one or more motors (not shown in FIG. 1A). The motor may be configured to move the wheel by rotationally driving the wheel (e.g., to move forwards or backwards). In some examples, a separate motor may be used to turn the wheel at an angle (e.g., to steer right or left). The motor may be, for example, a geared electric hub motor or any other suitable motor for moving the wheel.

Figure 2:
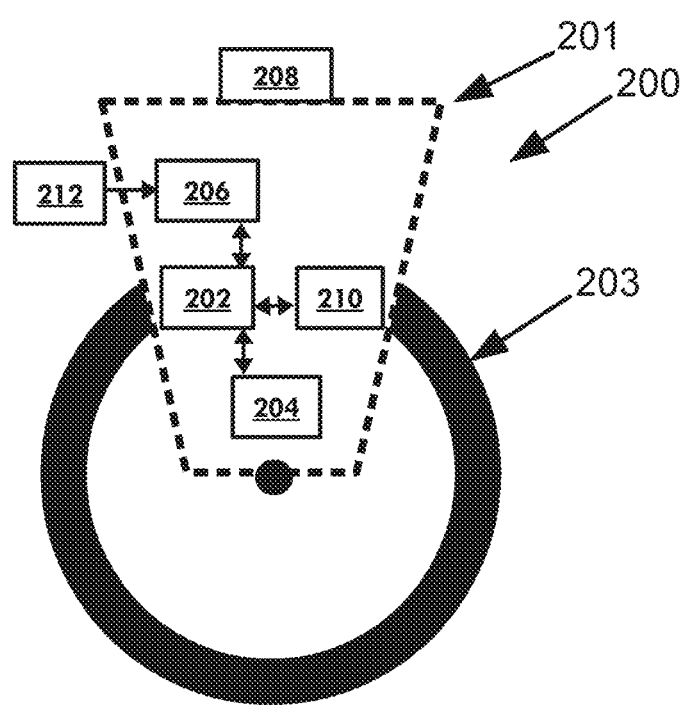
FIG. 2 is a schematic diagram of a wheel assembly according to non-limiting embodiments.

Referring now to FIG. 2, shown is a schematic diagram of a wheel assembly 200 according to a non-limiting embodiment. The wheel assembly includes a wheel 203, a housing 201, and an attachment arrangement 208. A motor 204 may be located at least partially within the housing 201 and may be mechanically coupled with the wheel 203. The motor 204 may be configured to move the wheel 203 rotationally, apply a torque to the wheel 203 or/and to sense a force applied on the wheel 203. The motor 204 receives commands from a controller 202. The wheel assembly may also include a communication interface 206 for establishing communication between the controller 202 and one or more other wheel assemblies, one or more external computing devices, one or more central controllers located on a vehicle, and/or the like. A memory device 210 and other computing device components may be in communication with the controller 202. In FIG. 2, the communication interface 206 is shown connected to a peripheral device 212, such as a camera mounted on the vehicle chassis and/or the wheel assembly 200. The memory device 210 may store information collected during operation of the wheel assembly, such as geolocation, sensor data, data from connected devices, and/or the like.

Although one communication interface 206 is shown in FIG. 2, it will be appreciated that separate communication interfaces 206 may be used for communication with an external computing device and communication with intra-vehicle components, such as another wheel assembly, a peripheral device 212, and/or the like. In non-limiting embodiments, the communication interface 206 may be a hub for a Controller Area Network (e.g., a CAN bus) that facilitates communication among controllers and devices connected to the hub. In some non-limiting embodiments, each device connected to the system may be denoted as a node in an intra-vehicle network. The communication interface 206 may include modular waterproof connectors, as an example, and utilize bus cables that transmit data and low voltage power.

In non-limiting embodiments, an intra-vehicle communication network is established that includes at least one wheel assembly and at least one other device such as, but not limited to, another wheel assembly, a peripheral device, a central controller, and/or the like. A wheel assembly may be associated with an identifier stored on one or more memory devices 210. The identifier is preferably a unique identifier in the intra-vehicle communication network. For example, a wheel assembly may include memory 210 having a wheel assembly identifier stored thereon that uniquely identifies the wheel assembly to external devices and/or other devices connected to the intra-vehicle communication network. The wheel assembly identifier may be used to control the wheel.

Figure 3:
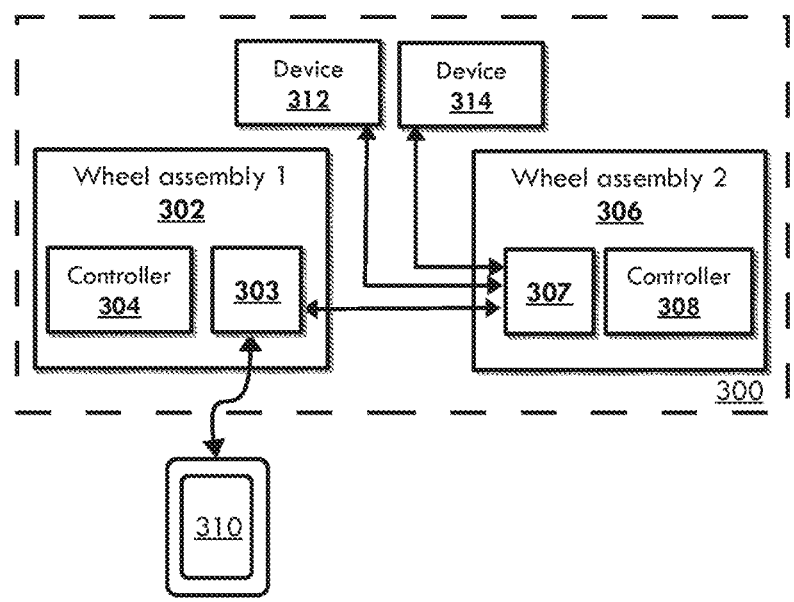
FIG. 3 is a schematic diagram of a modular vehicle according to non-limiting embodiments.

Referring now to FIG. 3, a schematic diagram of a modular vehicle 300 is shown according to non-limiting embodiments. A first wheel assembly 302 includes a controller 304 and a communication interface 303. A second wheel assembly 306 also includes a controller 308 and a communication interface 307. In some examples, the wheel assemblies may include multiple communication interfaces, such that a first communication interface is used to communicate with external devices (e.g., mobile device 310) and a second communication interface is used to communicate with other components of the modular vehicle 300 (e.g., on an intra-vehicle network, for example). In the example shown in FIG. 3, a single communication interface 303 is shown that may represent one or more communication interfaces.

With continued reference to FIG. 3, the mobile device 310 or any other type of computing device may be used to communicate with one or more controllers (e.g., controller 304) of the modular vehicle 300. In the depicted example, the mobile device 310 communicates with the communication interface 303, which allows the mobile device to control both the controller 304 of the first wheel assembly 302 and the controller 308 of the second wheel assembly 306. This arrangement may also permit the mobile device 310 to communicate with and control devices 312, 314, which may include any type of additional device or module such as, for example, one or more cameras, lights, tools (e.g., task-specific farm tools), and/or controls. As shown, a daisy-chain arrangement is used to connect all of the communicative components of the modular vehicle 300 to form an intra-vehicle network of devices (e.g., wheel assemblies 302, 306, devices 312, 314, and/or the like). In other non-limiting embodiments, a hub-and-spoke network (e.g., star topology), a mesh network, and/or a ring network (e.g., ring topology) arrangement may be used. A bus (not shown in FIG. 3) may also be provided for connecting the communicative components of the module vehicle 300.

Figure 4:
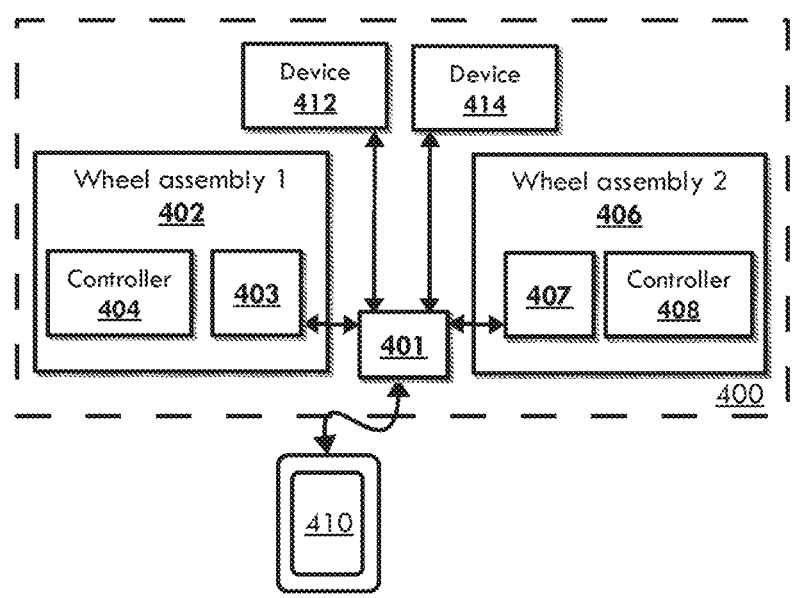
FIG. 4 is a schematic diagram of a modular vehicle according to non-limiting embodiments.

Referring now to FIG. 4, a schematic diagram of a modular vehicle 400 is shown according to further non-limiting embodiments. In the depicted example, a central controller 401 located on the vehicle 400 may act as a central communication hub, establishing a hub-and-spoke intra-vehicle network. The central controller 401 may be arranged on the vehicle 400 as a separate controller or, in some examples, a controller 404 of a first wheel assembly 402 may be designated as a central controller. The central controller 401 may be in direct or indirect communication with devices 412, 414. In further non-limiting embodiments, the mobile device 410 may act as an external central controller that individually communicates with and controls each of the communicative components on the modular vehicle 400. A second wheel assembly 406 also includes a controller 408 and a communication interface 407. In some examples, the wheel assemblies may include multiple communication interfaces, such that a first communication interface is used to communicate with external devices (e.g., mobile device 410) and a second communication interface is used to communicate with other components of the modular vehicle 400 (e.g., on an intra-vehicle network, for example).

Figure 6:
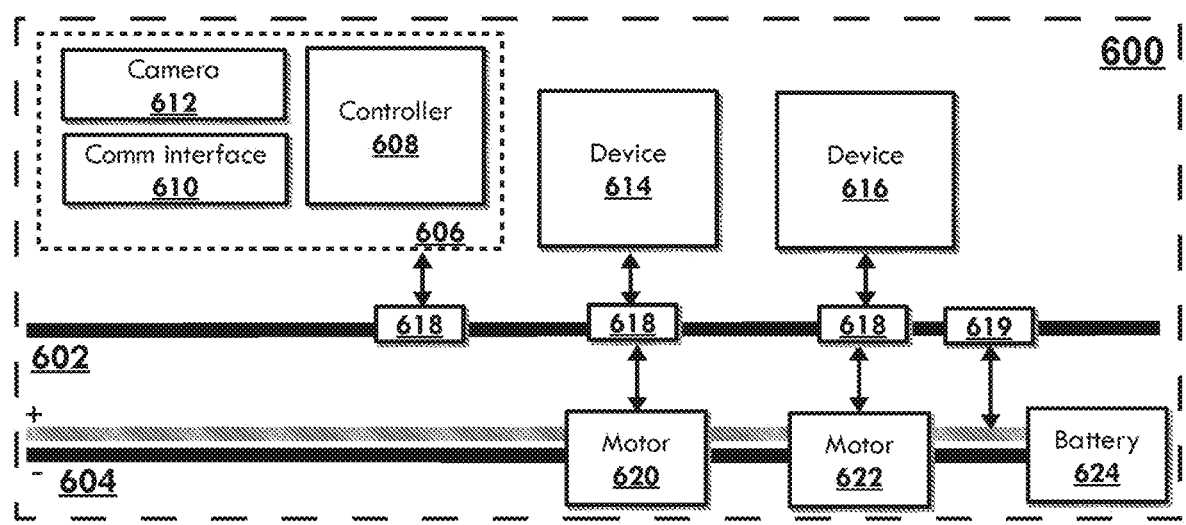
FIG. 6 is a schematic diagram of a modular vehicle according to non-limiting embodiments.

In non-limiting embodiments, the central controller 401 may implement an adaptable kinematic model to control the individual controllers 404, 408 for each motor. The central controller 401 may execute a kinematic model as a function defined by variables such as a number of wheel assemblies, a weight of the vehicle, expected ground properties (e.g., friction, slope, resistance, and/or the like), and/or other like vehicle or environmental parameters. The central controller 401 coordinates the motion of the wheels and may be arranged as in FIG. 4 (connected directly), connected along a common data bus (as shown in FIG. 6), and/or in any other manner. The central controller 401 may interface between high-order control algorithms and/or user control to low-level commands receivable by the individual controllers 404, 408 to operate the motor. For example, the commands issued to the controllers 404, 408 may cause the motor to move forward 12 inches or some other specified distance, and/or to achieve a position (e.g., a GPS location or other absolute location, a location relative to a starting location or an object or entity, an orientation, and/or the like).

In non-limiting embodiments, the central controller 401 may issue commands to the controllers 404, 408 to control the respective motors via a velocity control mode (e.g., changing velocity of motor shaft with an updated rotations per minute value or "RPM" value), a current/torque control mode (e.g., change current applied to motor), and/or a position control mode (e.g., change degree of rotation). The central controller 401 may issue such commands by establishing a set point for the position, velocity, and/or current/torque, generating commands to achieve the set point, and modifying the set point based on feedback data received from the individual controllers 404, 408 and/or sensors that indicate a current state of the motor. In this manner, the central controller 401 can determine the specific commands based on the current state and the desired state of the motor and/or the vehicle. In non-limiting embodiments, control algorithms may be used that represent the vehicle as a single rigid body with linear velocity, angular velocity, and a pose in the environment.

Figure 5A:
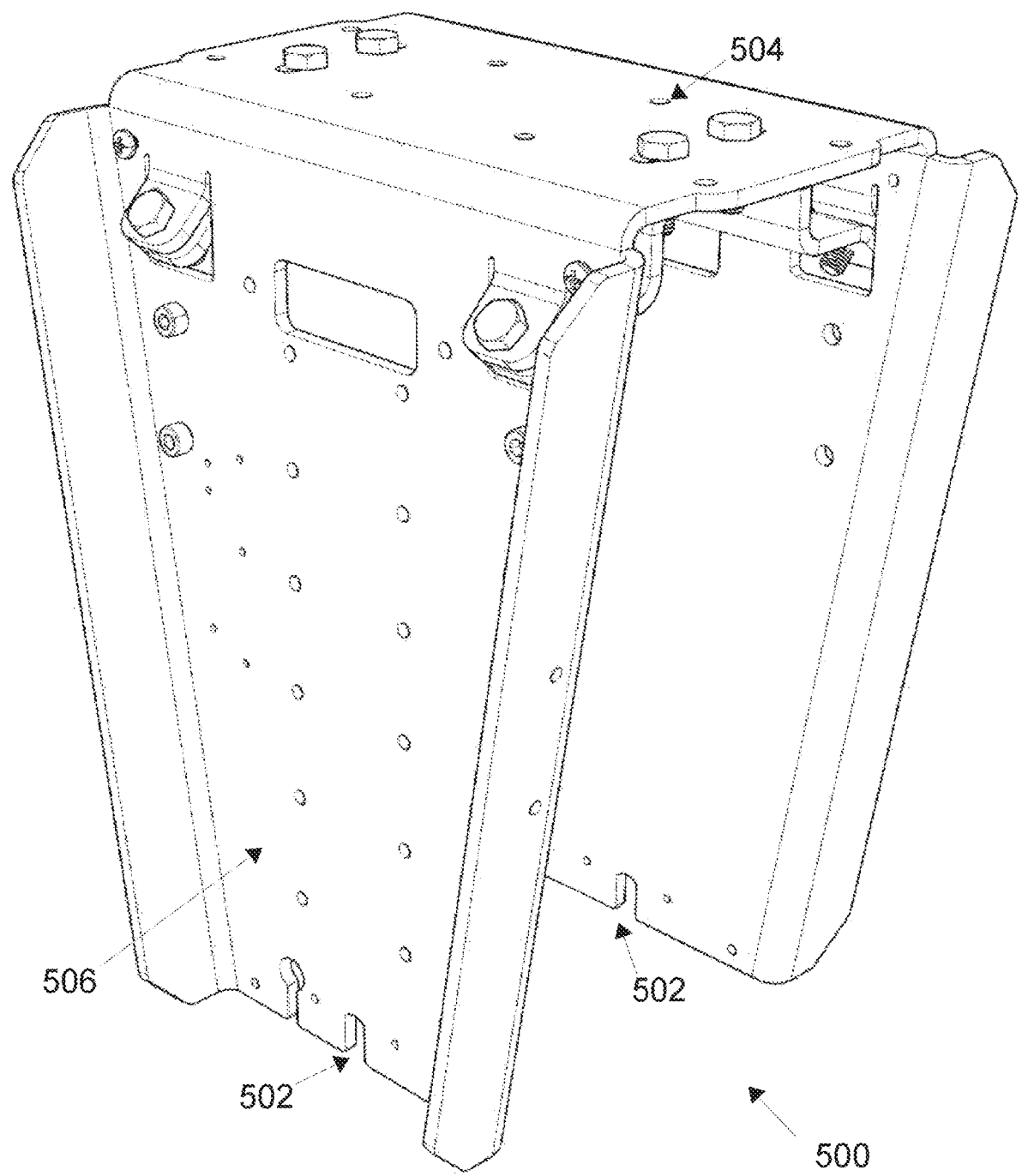
FIG. 5A is a diagram of a wheel assembly housing according to non-limiting embodiments.

Referring now to FIG. 5A, shown is a housing 500 for a wheel assembly according to a non-limiting embodiment. A top portion 504 of the housing may be flat or curved and support an attachment arrangement (not shown in FIG. 5A) for connecting to an external support. Apertures are shown on the top portion 504 for securing (e.g., bolting) an attachment arrangement. A side portion 506 extends downward from the top portion 504 and includes a notch 502 for receiving a wheel (e.g., an axle of a wheel). In non-limiting embodiments, the housing 500 is a single sheet of material (e.g., metal) that is bent to form a U-shape or fork. In other non-limiting embodiments, the housing 500 may be formed from any suitable material and may be formed from one or several pieces. In a non-limiting embodiment, the housing 500 is formed from a single sheet of metal that is cut from a flat sheet, punctured with apertures, and bent to form the shaped housing. In non-limiting embodiments, one or more attachment arrangements (not shown in FIG. 5A) may be built into the housing 500. For example, the housing 500 may include a longitudinal clamp and a cross clamp for securing two perpendicular supports.

Referring now to FIGS. 5B-5E, attachment arrangements are shown according to non-limiting embodiments. The attachment arrangement 508 shown in FIGS. 5B and 5C receives a square-shaped support (e.g., such as a square bar, rail, or tube). The attachment arrangement 510 shown in FIGS. 5D and 5E receives a round-shaped support (e.g., such as a cylindrical bar, rail, or tube). Other shapes and arrangements are possible in further non-limiting embodiments.

Referring now to FIG. 6, a schematic diagram of a modular vehicle 600 is shown according to non-limiting embodiments. A power bus 604 provides power from a battery 624 to motors 620, 622 and the devices connected to the data bus 602. The motors 620, 622 may be part of separate wheel assemblies and the power bus 604 may provide power to each wheel assembly, including the motors 620, 622. The data bus 602 may be a CAN bus or any other type of communication device suited for intra-vehicle communication. In some non-limiting embodiments, each device connected to the modular vehicle and connected to the data bus 602 may be denoted as a node in an intra-vehicle network. In non-limiting examples, the data bus 602 may include a National Marine Electronics Association (NMEA) backbone cable and connectors 618 may include NMEA T-connectors. Connectors 618 may include, for example, circular connectors (e.g., M12 a-coded 5-min) or any other type of connector. Connectors 618 may be waterproof and/or standardized in some examples. Using a marine standard, such as NMEA, in an agricultural environment provides unique advantages by allowing for operation in rugged and wet conditions. A connector 619, connecting the power bus 604 to the data bus 602, may include a power injector to provide power to the data bus 602. It will be appreciated that any suitable communication system and connectors may be used. The dual bus arrangement shown in FIG. 6, including a power bus 604 and a data bus 602 where the power bus 604 is independent of and has a higher voltage than the data bus 602, provides an advantage to existing high-voltage buses used for communication (e.g., such as an agricultural CAN bus). This arrangement conserves energy such that operating the vehicle has a lower cost and longer battery life.

With continued reference to FIG. 6, the data bus 602 supports an intra-vehicle network of devices through the connectors 618. It will be appreciated that wireless adapters may also be used to connect devices to the data bus 602. The data bus 602 may operate at a low power (e.g., less than 96 volts and less than 10 amps, as an example). A main unit 606 includes a controller 608, a communication interface 610, and a camera 612 (e.g., a standard camera, a LiDAR camera, an infrared camera, and/or the like). The communication interface 610 may be used to communicate with an external device, such as a mobile device (not shown in FIG. 6). The communication interface 610 and/or a separate communication interface may also be used to communicate with the data bus 602 and the devices connected to the data bus 602 (e.g., a device 614, a device 616, the motor 620, the motor 622, etc.). In some non-limiting embodiments, the modular vehicle 600 may not include a main unit 606 or controller 608 and, instead, utilize individual controllers of each device arranged in a daisy-chain manner or in any other configuration. Various arrangements are possible.

FIG. 6 shows two devices 614, 616, in addition to the main unit 606 and motors 620, 622, connected to the bus 602. It will be appreciated that any number of devices, including one or more additional wheel assemblies, may be added as a module to the vehicle 600. For example, device 614 may be a wired or wireless mechanism to control movement of the modular vehicle 600 (e.g., such as a remote control). Device 616 may be an emergency shut-off switch to cut power and/or stop movement. Devices 614, 616 or additional devices may include lights (e.g., LEDs or the like) for indication of a status or illumination of an area, display screens (e.g., LCD displays or the like), bumper stops with sensors, proximity sensors, joysticks, e-stop circuits, memory devices, and/or the like. A memory device, for example, may store data from the intra-vehicle network such as, but not limited to, IMU data, geolocation data, and/or the like.

With continued reference to FIG. 6, various other devices, such as farming tools, may be connected to the bus 602 using a connector 618. Moreover, as described herein, devices (including devices 614, 616) may be connected to the bus 602 via a communication interface on an individual wheel assembly (e.g., associated with motor 620 or motor 622). For example, a device (e.g., device 614) may be an electronically-controlled compost/amendment spreader for use in agricultural applications. The device 614 may be a separate and independent tool that attaches to the vehicle 600 (e.g., through a support and attachment arrangement as described herein with respect to the wheel assemblies or in any other like manner). In this manner, the operator may control the device 614 through a common control interface that communicates with the data bus 602 (via the main unit 606 or in any other way) to, for example, modify the distribution of compost/amendments. Likewise, the operator may receive feedback from the device 614 through the same data bus 602, such as collected data concerning a weight and/or volume of compost distributed, identified by geolocation and associated with operational parameters such as the distribution rate.

Figure 7:
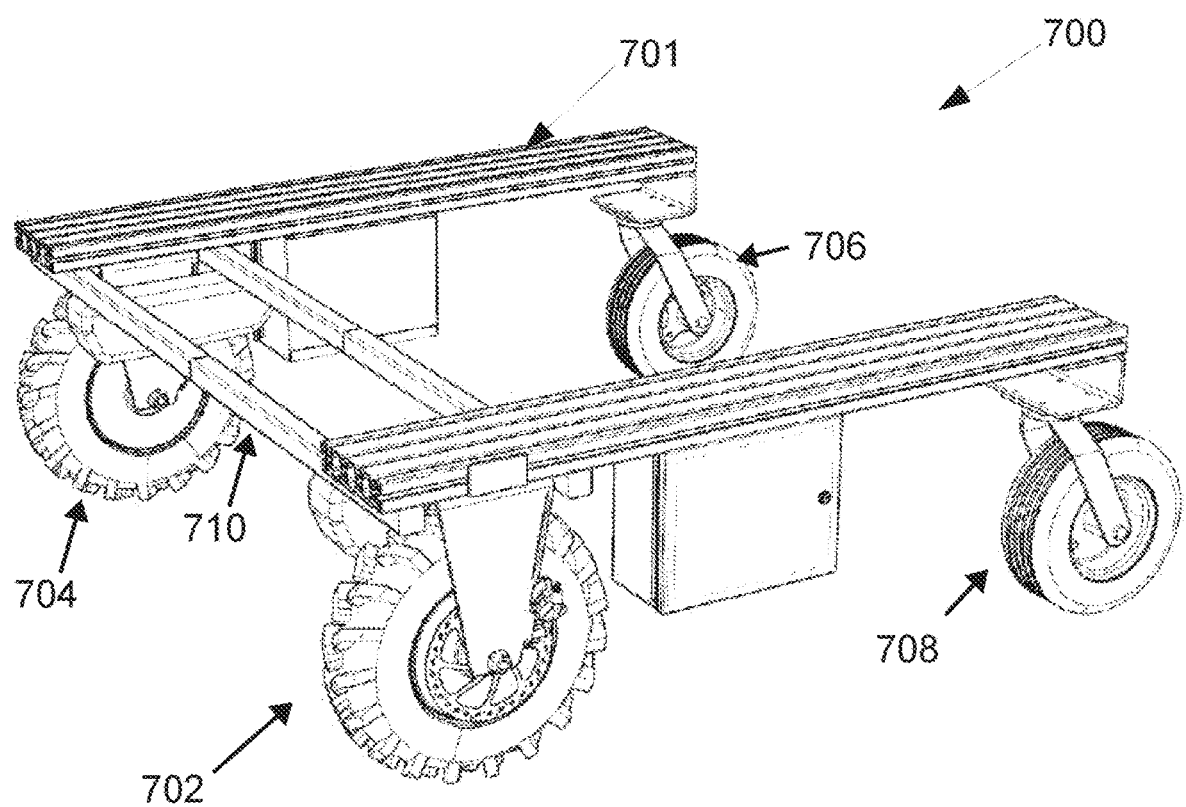
FIG. 7 is a diagram of a module vehicle according to non-limiting embodiments.

Referring now to FIG. 7, a modular vehicle 700 is shown according to a non-limiting embodiment. The modular vehicle includes a chassis 701 supporting wheel assemblies 702, 704 and passive caster wheels 706, 708. The wheel assemblies 702, 704 are secured to a support 710 of the chassis 701. Although the vehicle 700 is shown with two wheel assemblies 702, 704 with motors, it will be appreciated that one wheel assembly or numerous wheel assemblies may be connected to the vehicle 700 instead of or in addition to the passive caster wheels 706, 708. In some non-limiting embodiments, an additional wheel assembly may be added in the center of the modular vehicle 700 to increase torque output. Additional components may be secured to the support 710 of the chassis 701, including but not limited to cameras, lights, tools, seats (e.g., driver and/or harvester seats for riding the vehicle), and/or the like.

The modular vehicle 700 may be used as an agricultural field robot, as an example, moving platforms and/or farming tools through fields and in greenhouses and hoop houses. In other examples, the modular vehicle 700 may be used for any application in which it is desirable to have an adjustable manually controlled, autonomous, or semi-autonomous vehicle. For example, warehouses may utilize a modular vehicle to move items to and from shelves and to different areas, to monitor storage, and/or the like.

In non-limiting embodiments, the modular vehicle may be controlled based on an adaptable kinematic model. For example, a configuration of the vehicle including parameters such as a number of wheels, a number of motor-driven wheel assemblies, a position of wheels (e.g., width between wheels, placement with respect to chassis, and/or the like), a height of wheels, a height of the chassis, a width of the chassis, a function, and/or the like may be used to control movement of the vehicle. These parameters may be inputted by a user during a configuration phase. Additionally or alternatively, these parameters may be dynamically determined with one or more positional sensors and/or other measurement data available. Using an adjustable kinematic model improves upon calibration processes for robotic vehicles that require lengthy processes with fiducial markers and/or metrology equipment, high-resolution wheel encoders, and/or precision machining in all linkages for precision assembly and known distances between actuators (e.g., wheel assemblies). The kinematic model may be trained and adjusted based on usage of the modular vehicle and other feedback, including supervised and unsupervised learning techniques.

The use of a kinematic model allows the vehicle to move in accurate and/or specified ways, such as turning 90 or 180 degrees at the end of a row, moving at a specific controlled vehicle speed to match a worker's pace or another machine's speed, such as 0.25 meters/second, and/or in any other manner as controlled by a user in real-time or programmed in advance. In non-limiting embodiments, the kinematic model includes one or more functions defined by variables such as a number of wheel assemblies, a weight of the vehicle, expected ground properties (e.g., friction, slope, resistance, and/or the like), and/or other like vehicle or environmental parameters. In some examples, the kinematic model may have a forward function that receives, as input, a wheel speed and outputs a vehicle velocity and an inverse function that receives, as input, a vehicle velocity and outputs a wheel speed. In some examples, inputs to the kinematic model may include a configuration of the wheel assembly, a state of the wheel assembly, the dimensions of the modular vehicle, a state of the modular vehicle, a current location and/or direction, and/or a target location and/or direction. The kinematic model may then output commands (e.g., commands to control the motor of each individual wheel assembly). In non-limiting embodiments, the kinematic model may be geometry based and be configured to generate a geometric transformation between a target location or direction and the rotational angle and/or torque to apply to each wheel assembly motor to achieve the target location or direction.

The kinematic model also allows for position-based control, where the vehicle moves forward (or backward) a set distance (e.g., 12 inches) and stops, which is useful for applications such as planting or mechanical weed cultivation, as examples. A kinematic model is also used to enable force/torque estimates based on wheel torques, and is therefore used by a user interface based on these features. The kinematic model and associated estimate of the vehicle state is used as a prior probability distribution for high order functionality such as autonomous navigation or remote control. Due to the user configuration of the vehicle structure, the kinematic model is configured to be adapted to arbitrary configurations, and these parameters of the kinematic model are exposed to and settable by the user.

In non-limiting embodiments, the modular vehicle may automatically calibrate itself based on camera data, geolocation data (e.g., such as data from a Global Positioning System (GPS) device on the vehicle), inertial data (e.g., such as data from an Inertial Measurement Unit (IMU) on the vehicle), historical motion data (e.g., such as data from manual operation of the vehicle), and/or the like. In some examples, calibration may be performed based on one or more fiducial markers detected by a camera on the modular vehicle.

GPS signals are not reliable near urban areas or in enclosed spaces like greenhouses where occlusions happen. There is also a need for data links and expensive base stations in remote rural areas. The requirements of a GPS signal or more generally a (global or local) positioning signal drives up costs and limits the adoption of autonomous tractors.

In non-limiting embodiments, a simultaneous localization and mapping (SLAM) algorithm may be utilized to monitor the location of the modular vehicle while forming or adjusting a mapping of an environment in which the vehicle is moving. This can allow to follow a pre-set route automatically and accurately with camera data without the need for GPS signal. The camera data may be generated by a video camera installed on the front side of the modular vehicle and connected to the intra-vehicle network.

In some non-limiting embodiments, sensors on the modular vehicle (e.g., such as an IMU and/or motor sensor) may detect physical feedback, such as force or torque, and use this information to calibrate the modular vehicle for a particular operating environment. This feedback information can also be used to steer the modular vehicle to follow a row of raised beds for instance.

In some non-limiting embodiments, sensors on the modular vehicle (e.g., such as an IMU and/or motor sensor) may detect physical feedback, such as force or torque, and use this information to calibrate the modular vehicle for a particular operating environment. For example, a change in force or torque by a motor may indicate that the vehicle has encountered an obstacle and/or environmental feature (e.g., an inclined surface, a bumpy surface, a smooth/slick surface, and/or the like) and is exerting more force and/or torque than expected.

In some examples, force-sensing bumper stops, proximity sensors, and/or the like, may be added to the modular vehicle and connected to a common data bus in an intra-vehicle network as input parameters for calibration.

In some examples, manual operation of the modular vehicle may be monitored and recorded (e.g., via camera data, geolocation data, inertial data, and/or the like) to be used as training data for vehicle control and/or calibration algorithms. Through monitoring the data, for example, steering behavior may be learned. Such control input may be provided via voice commands over time (e.g., received via a microphone and/or a mobile device with network connection).

In non-limiting embodiments, a wired manual control device may be physically connected to the vehicle and configured to control it. Control devices that are rigidly attached to the vehicle may be difficult to operate in rugged environments (e.g., such as agricultural environments) due to the vehicle pitching, rolling, pulling, and/or the like. Moreover, wireless control devices require batteries and a wireless connection that requires a pairing set-up and could be interrupted or unreliable. Utilizing a wired manual control device may be configured to provide flexibility and degrees of freedom due to the vehicle potentially pitching, rolling, and being pulled (e.g., under power). The control device may be in the form of a joystick, for example, that can be holstered on the vehicle and removed by a user to decouple the vehicle movement from the user. The joystick may be connected through a flexible cable such that the joystick is not rigidly attached to the vehicle and can move with respect to the vehicle. The cable may include, for example, a coiled cable, a wound cable on a reel, and/or any other type of physical connection cable that permits a user to remove the manual control device from a location fixed on the vehicle (e.g., a holster or mount).

In some non-limiting examples, the cable for the manual control device may limit any excessive slack between the vehicle and the user by being compressed, coiled, reeled, and/or the like. For example, the cable may automatically retract towards to the vehicle if the user moves towards the vehicle or releases the manual control device. Such an arrangement allows the user to maintain a safe distance from the vehicle without the vehicle pulling them, dragging a cable, or needing a recoil mechanism. The manual control device may allow a wide range of movement through the control of one or more wheel assemblies, allowing for a zero-turn (e.g., turn in place) movement. In non-limiting embodiments, the manual control device may be connected to the modular vehicle as a node connected to the common data bus (e.g., data bus 602 shown in FIG. 6).

In non-limiting embodiments, the commands used to control the modular vehicle with the manual control device may be stored (e.g., on a memory device on the vehicle or external to the vehicle) and used to train an autonomous or semi-autonomous mode of the vehicle. For example, the saved commands in combination with associated geolocations and/or feedback may be used as input into a machine learning model such as but not limited to a neural network, a linear regression model, and/or the like.

In non-limiting embodiments, the modular vehicle may be used for harvesting crops. Existing harvesting machinery is large, heavy, and engineered for one type of crop. Moreover, driving tractors or trucks in crop fields to tow such machinery causes undesirable soil compaction, resulting in lower yield, higher runoff, higher $CO_2$ emissions, and higher fuel usage. Moreover, such machinery cannot usually be easily turned around or precisely steered in greenhouses, hoop houses, or the like, therefore requiring human labor to harvest or to manually maneuver the harvesting machinery. Moreover, existing electric wheelbarrows and carts for greenhouses do not have the ability to straddle crop beds or be easily controlled. In non-limiting embodiments, the modular vehicle may be programmed to operate autonomously and to follow a control device and/or human operator, keeping a safe distance from farmers during harvest in a hands-off manner. The modular vehicle may use one or more cameras and/or positioning devices to autonomously move the vehicle to follow the operator, control device, or a pre-set route and routine. In some examples, a location sensor and/or IMU may be provided in the control device to provide location and/or movement information to the modular vehicle concerning the relative location of the control device.

In non-limiting embodiments, torque and/or force feedback may be used for controlling a vehicle during both calibration and operation. Torque feedback may be determined based on, for example, motor sensors in the wheel assembly and/or power being drawn from the motor. An increase in torque may be used to determine that the modular vehicle is deviating from a straight line and climbing an object or feature (e.g., such as a raised garden bed). Torque and/or force (e.g., determined by one or more IMUs or other sensors) may be used to determine if an obstacle has been collided with, if a user is pushing or pulling the modular vehicle, and/or if there is some other obstacle. The modular vehicle may, for example, stop moving in response to detecting an increase in torque that satisfies a predetermined threshold.

In non-limiting embodiments, feedback from the motors in the individual wheel assemblies is received by a central controller or another computing device. Based on this feedback, one or more motor states (e.g., one or more statuses) can be determined including, for example, a current being used by the motor. The amount of torque being applied by the motor can then be determined based on the current. The amount of torque may be based on the current, the position, and the velocity of the motor. The position and/or velocity of the motor may be received from an encoder and/or determined based on a sensor, such as a Hall Effect sensor. Moreover, in non-limiting embodiments, vehicle state information (e.g., a status of the vehicle) may be used to determine an estimated force the vehicle is applying to the ground to move at a particular speed. Such vehicle state information may include, for example, the position and/or orientation of the vehicle based on a camera-based visual navigation system, GPS, an IMU, wheel odometry and the kinematic model, and/or other like inputs. The determined force is related to the weight of the vehicle, the traction of each wheel, and the slope of the ground. Deviations of the estimated force and the expected force (given by the kinematic model and dynamic model of the vehicle), are used to determine environmental conditions, such as climbing a hill, climbing out of a furrow onto a raised bed, hitting an obstacle with the vehicle chassis, hitting an obstacle with a single wheel, where and how hard something is pushing on a corner or portion of the vehicle chassis, if one of the wheels has lost traction due to being lifted off the ground or rolling through mud, and/or the like. In non-limiting embodiments, sensed force may be used to control one or more aspects by a user, such as configuring the vehicle to respond to a push or kick (or striking an object or entity, such as a rock, animal, person, or the like) to start or stop a process (e.g., moving straight along a row), controlling the vehicle with two ropes attached to each side of the vehicle like reins on a horse that are sensed, or automatically guiding the vehicle along a road way or along the level contour of a hill.

Figure 8A:
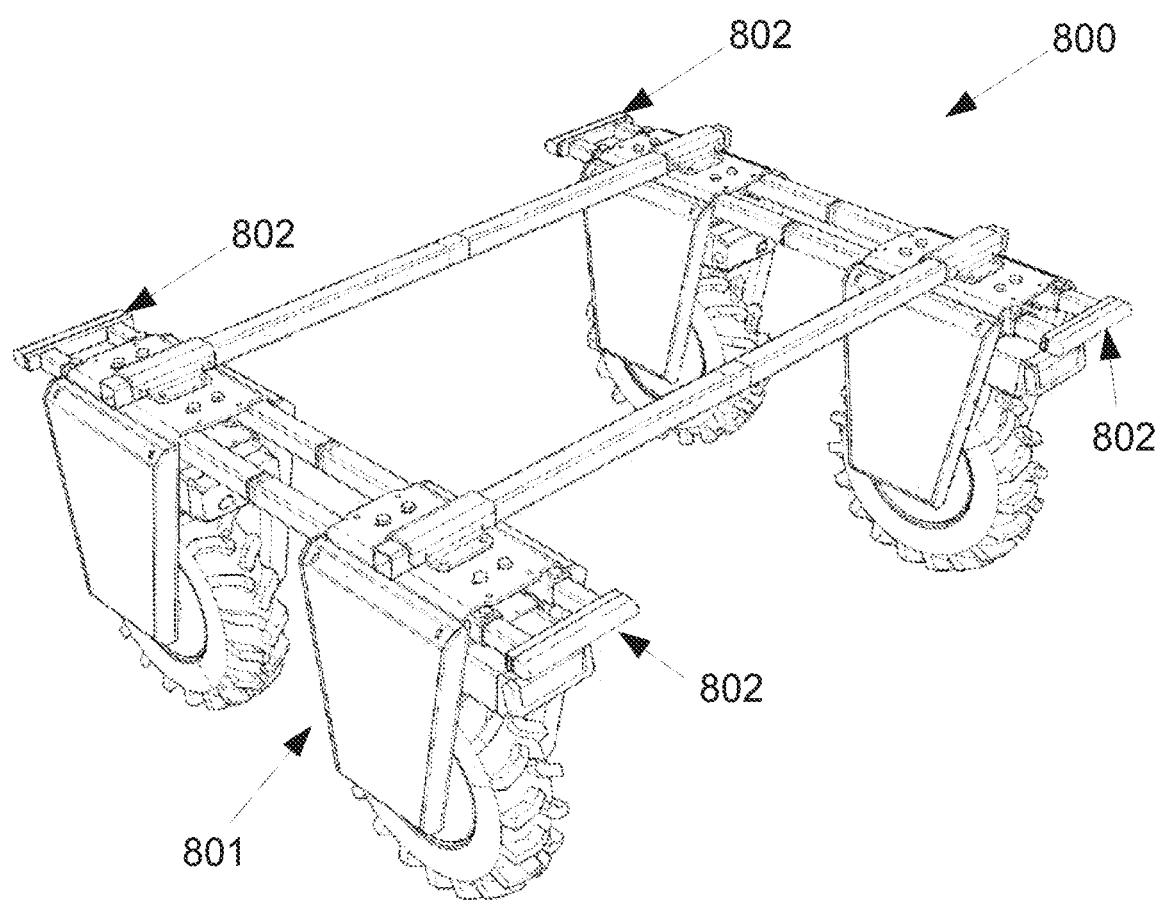
FIG. 8A is a perspective view of a modular vehicle according to non-limiting embodiments.
Figure 8B:
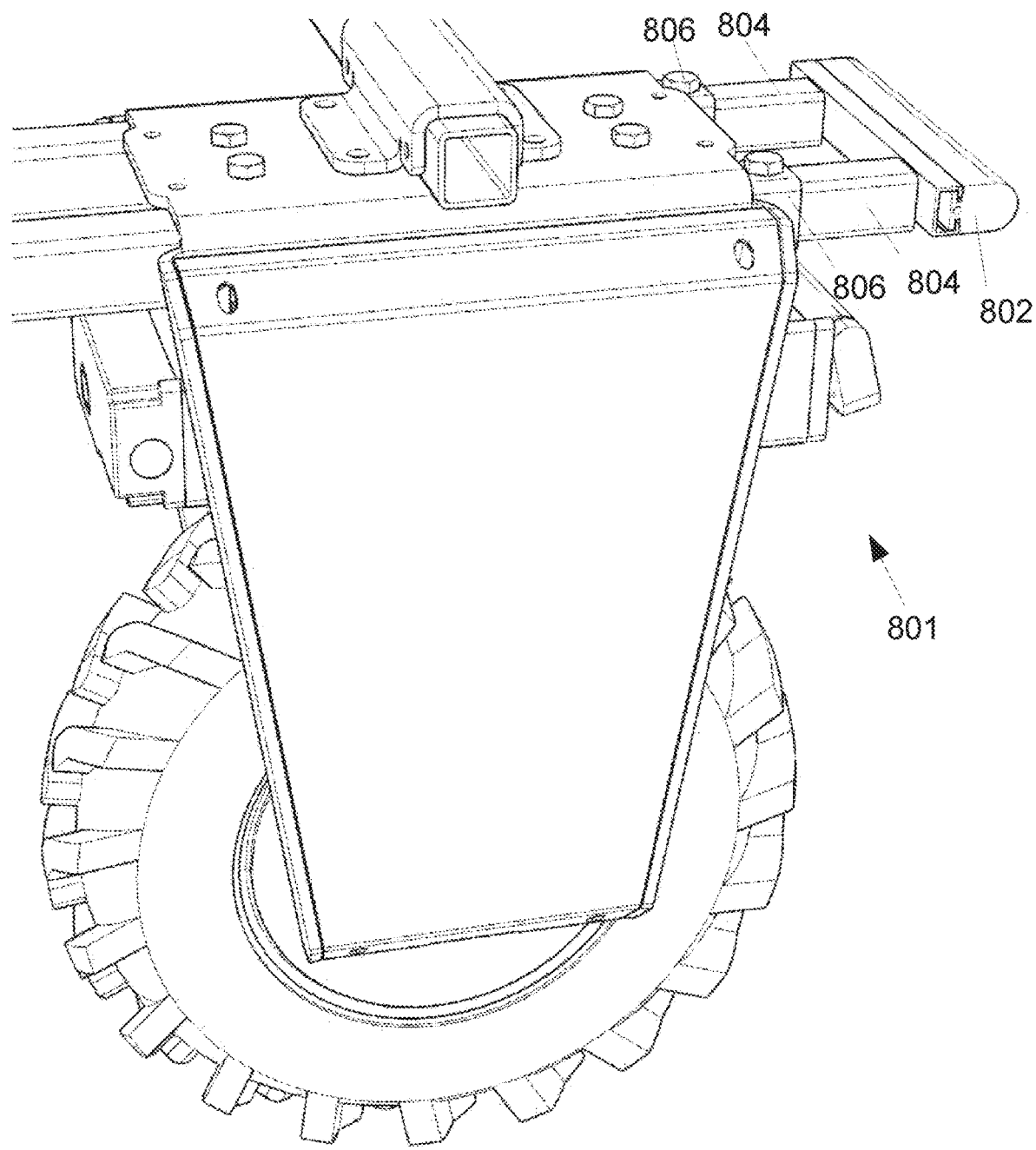
FIGS. 8B-8D are perspective views of a wheel assembly according to non-limiting embodiments.
Figure 8C:
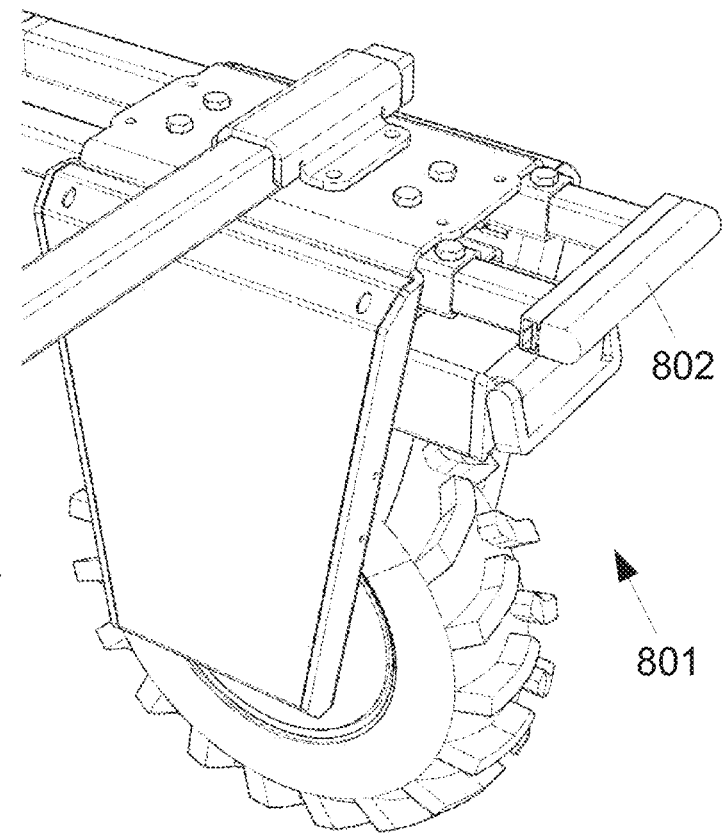
Figure 8D:
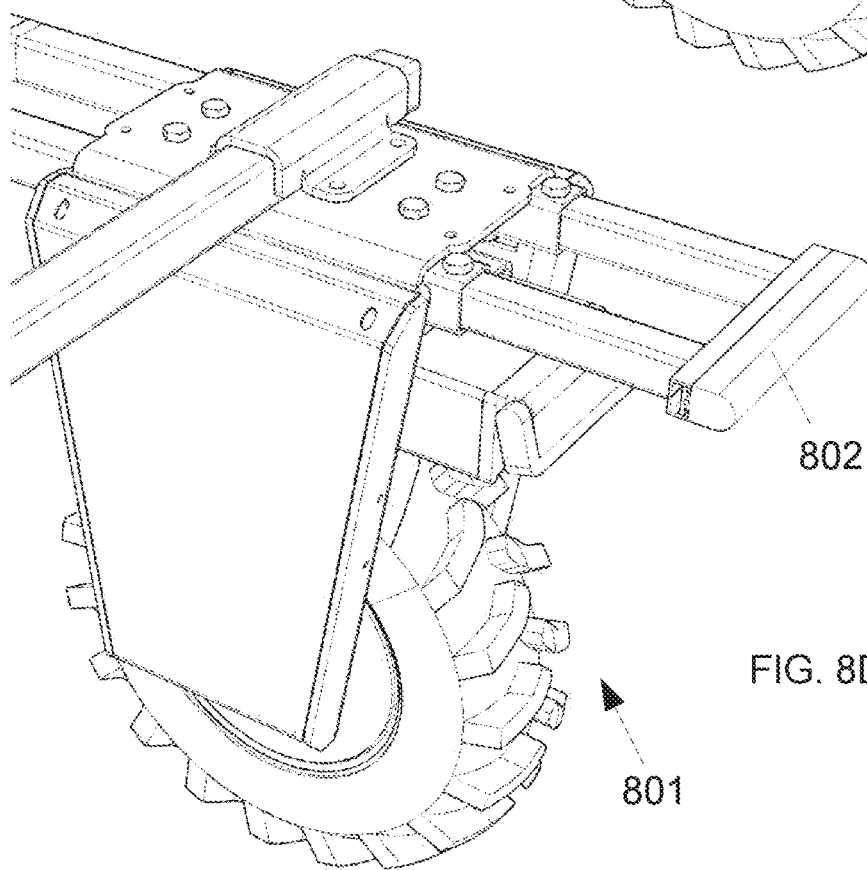

Referring now to FIGS. 8A-8D, a modular vehicle 800 and wheel assemblies 801 are shown according to non-limiting embodiments. One or more wheel assemblies 801 may be equipped with a bumper 802. In the depicted examples, the bumper 802 is vertically aligned with the wheel and extended in a direction of travel of the wheel. However, various arrangements of one or more bumpers extending from the modular vehicle 800 are possible. As shown in FIG. 8B, the bumper may be arranged on the end of one or more supports 804 connected to the wheel assembly 801 via one or more attachment arrangements 806. The bumper 802 may be made of any material, such as rubber. In some non-limiting embodiments, the bumper 802 may include one or more sensors, such as force sensors, proximity sensors, and/or the like. Additionally or alternatively, a controller (such as a wheel controller and/or a central controller) may detect a collision between the bumper 802 and an object or entity based on feedback from the motor, such as but not limited to current/torque, as described herein. FIG. 8D shows the bumper 802 in an extended position with respect to the wheel assembly 801 as compared to the arrangement shown in FIG. 8C.

Figure 9:
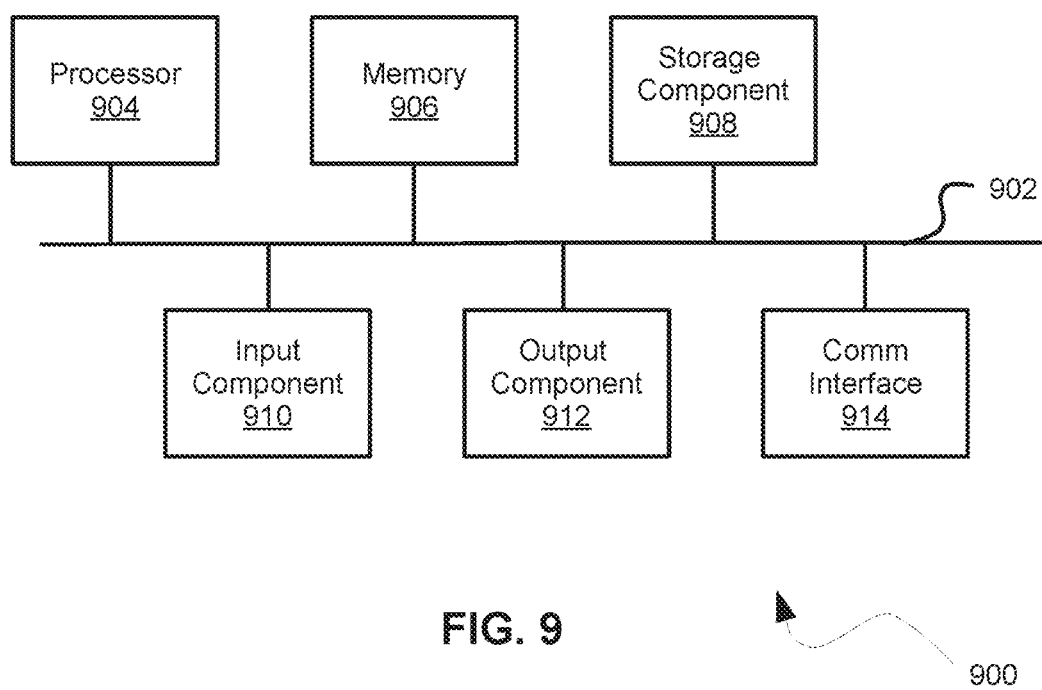
FIG. 9 illustrates example components of a device used in connection with non-limiting embodiments.

Referring now to FIG. 9, shown is a diagram of example components of a device 900 according to non-limiting embodiments. Device 900 may correspond to controller 202 in FIG. 2, controller 304, controller 308, controller 401, and/or mobile device 310 in FIGS. 3 and 4, main unit 606 and/or controller 608 in FIG. 6, as examples. In some non-limiting embodiments, such systems or devices may include at least one device 900 and/or at least one component of device 900. The number and arrangement of components shown are provided as an example. In some non-limiting embodiments, device 900 may include additional components, fewer components, different components, or differently arranged components than those shown in FIG. 9. Additionally, or alternatively, a set of components (e.g., one or more components) of device 900 may perform one or more functions described as being performed by another set of components of device 900.

As shown in FIG. 9, device 900 may include a bus 902, a processor 904, memory 906, a storage component 908, an input component 910, an output component 912, and a communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a CPU, a GPU, an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 9, storage component 908 may store information and/or software related to the operation and use of device 900. For example, storage component 908 may include a hard disk (e.g., a magnetic disk, an optical disk, a magneto-optic disk, a solid state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a GPS component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although the disclosed subject matter has been described in detail for the purpose of illustration based on what is currently considered to be the most practical and preferred embodiments or aspects, it is to be understood that such detail is solely for that purpose and that the disclosed subject matter is not limited to the disclosed embodiments or aspects, but, on the contrary, is intended to cover modifications and equivalent arrangements that are within the spirit and scope of the appended claims. For example, it is to be understood that the presently disclosed subject matter contemplates that, to the extent possible, one or more features of any embodiment or aspect can be combined with one or more features of any other embodiment or aspect.

What is claimed is:

1. A wheel assembly comprising:
    a housing having a top side;
    an attachment arrangement on the top side of the housing and configured to be removably attached to an external support;
    a wheel supported by the housing and arranged below the top side of the housing;
    a motor supported by the housing and configured to move the wheel;
    a network interface supported by the housing;
    a controller in communication with the motor and the network interface, the controller configured to control the motor based on at least one command received via the network interface; and
    a computer-readable medium having stored thereon a unique identifier uniquely identifying the wheel assembly from a plurality of wheel assemblies, wherein the controller is configured to control the motor based on the unique identifier received via the network interface.

2. The wheel assembly of claim 1, wherein the motor is configured to move the wheel by at least one of rotationally driving the wheel and turning the wheel at an angle.

3. The wheel assembly of claim 1, further comprising a battery dock supported by the housing and in communication with the motor, the battery dock configured to receive a removable battery.

4. The wheel assembly of claim 1, wherein the attachment arrangement comprises a clamp.

5. The wheel assembly of claim 1, wherein the attachment arrangement is configured to receive the external support and to slide along the external support.

6. The wheel assembly of claim 1, wherein the housing is fork-shaped such that two portions of the housing extend downward from the top side of the housing to a center axis of the wheel.

7. The wheel assembly of claim 1, wherein the controller is configured to receive the at least one command from at least one other wheel assembly.

8. The wheel assembly of claim 1, wherein the attachment arrangement is fixed to or integral with the top side of the housing.

9. The wheel assembly of claim 1, wherein the housing comprises a sheet of material folded over a portion of the wheel.

10. The wheel assembly of claim 1, further comprising a data bus interface configured to communicate with other devices on a common data bus.

11. The wheel assembly of claim 10, further comprising a power bus interface configured to receive power from a power bus independent of the common data bus and the data bus interface.

12. A modular vehicle system comprising:
    a lateral support;
    a first wheel assembly removably attached to the lateral support, the first wheel assembly comprising a first controller;
    a second wheel assembly removably attached to the lateral support, the second wheel assembly comprising a second controller;
    a processor configured to communicate commands to the first controller and the second controller to control the first wheel assembly and the second wheel assembly; and
    a device network establishing communication between the processor, the first controller, and the second controller; and
    an attachment arrangement configured to removably attach at least one of the first wheel assembly and the second wheel assembly to the lateral support, wherein the attachment arrangement is configured to slide along the lateral support while unsecured.

13. The modular vehicle system of claim 12, wherein the first wheel assembly and the second wheel assembly are configured to slide along a length of the lateral support and to be removably attached to the lateral support at a chosen position.

14. The modular vehicle system of claim 12, wherein the device network comprises at least one of the following: a mesh network, a daisy-chained network, a hub-and-spoke network, or any combination thereof.

15. The modular vehicle system of claim 14, further comprising a camera in communication with the device network.

16. The modular vehicle system of claim 12, further comprising a vehicle chassis including the lateral support.

17. The modular vehicle system of claim 12, further comprising a battery dock configured to receive a removable battery.

18. The modular vehicle system of claim 12, wherein the device network comprises a data bus connected to each of the processor, the first controller, and the second controller.

19. The modular vehicle system of claim 18, further comprising a power bus independent of the data bus and having a higher voltage than the data bus, the power bus configured to provide power to a motor of the first wheel assembly, a motor of the second wheel assembly, and the data bus.

20. The modular vehicle system of claim 19, further comprising a connector including a power injector configured to provide power from the power bus to the data bus.

21. The modular vehicle system of claim 19, further comprising at least one agricultural tool connected to the data bus.

22. The modular vehicle system of claim 12, further comprising a bumper.

23. The modular vehicle system of claim 22, wherein the bumper comprises at least one sensor in communication with the processor via the device network.

24. The modular vehicle system of claim 12, wherein the processor comprises a central controller configured to issue commands to the first controller and the second controller based on a kinematic control model.

25. The modular vehicle system of claim 24, wherein the central controller is arranged on a vehicle chassis external from the first wheel assembly and the second wheel assembly.

26. A modular vehicle system comprising:
a lateral support;
a first wheel assembly removably attached to the lateral support, the first wheel assembly comprising a first controller;
a second wheel assembly removably attached to the lateral support, the second wheel assembly comprising a second controller;
a processor configured to communicate commands to the first controller and the second controller to control the first wheel assembly and the second wheel assembly;
a device network establishing communication between the processor, the first controller, and the second controller, the device network comprising a data bus connected to each of the processor, the first controller, and the second controller; and
a power bus independent of the data bus and having a higher voltage than the data bus, the power bus configured to provide power to a motor of the first wheel assembly, a motor of the second wheel assembly, and the data bus.

* * * * *